United States Patent
Park

(10) Patent No.: US 6,437,537 B2
(45) Date of Patent: Aug. 20, 2002

(54) BATTERY MODULE STRUCTURE FOR IMPROVING COOLING EFFICIENCY FOR ELECTRIC VEHICLE

(75) Inventor: Sun-Soon Park, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/751,297

(22) Filed: Dec. 29, 2000

(30) Foreign Application Priority Data

Dec. 30, 1999 (KR) .............................................. 99-66830

(51) Int. Cl.[7] .............................................. H01M 10/46
(52) U.S. Cl. ...................................... 320/107; 320/150
(58) Field of Search ................................ 320/107, 110, 320/112, 116, 150

(56) References Cited

U.S. PATENT DOCUMENTS 4,474,862 A * 10/1984 Buzzelli et al.
5,585,204 A * 12/1996 Oshida et al.
5,932,365 A * 8/1999 Lin et al.

* cited by examiner

*Primary Examiner*—Edward H. Tso
(74) *Attorney, Agent, or Firm*—Christie, Parker & Hale, LLP

(57) ABSTRACT

Disclosed is a battery module structure for an electric vehicle comprising a plurality of battery cells arranged adjacent to one another to form a group of battery cells; an end plate provided on each end of the group of the battery cells; one or more bands provided on opposing sides of the group of the battery cells, the bands being fastened to the end plates; an air plate interposed between each pair of battery cells; and a fan unit provided on top of the battery module, the fan unit blowing air onto the battery module.

2 Claims, 4 Drawing Sheets

BATTERY MODULE STRUCTURE FOR IMPROVING COOLING EFFICIENCY FOR ELECTRIC VEHICLE

CROSS-REFERENCE TO RELATED APPLICATIONS

This application claims priority of Korea patent Application No. 99-66830, filed on Dec. 30, 1999.

BACKGROUND OF THE INVENTION (a) Field of the Invention

The present invention relates to a battery module structure for an electric vehicle, and more particularly, to a battery module structure for an electric vehicle in which an air plate is provided between battery cells to improve cooling efficiency and minimize the accumulation of heat.

(b) Description of the Related Art

Rechargeable batteries are provided in an electric vehicle. However, because of limitations in capacity and size of a single battery, a plurality of battery cells is grouped together into a single mechanical and electrical unit called a battery module. These modules are electrically connected to form a battery pack, which powers the electronic drive systems.

As shown in FIG. 4, a conventional battery module 51 is realized by grouping together a plurality of battery cells 50. The battery cells 50 are arranged side by side, and an end plate 52 is provided on both ends of the group of the battery cells 50. A band 53 connects the end plates 52 on two opposing sides of the group of the battery cells 50.

However, in order to provide a uniform voltage and ensure a long life of the cells 50 that make up the battery module 51, it is necessary to maintain a uniform environment for all of the cells 50. In particular, a difference in voltage occurs when the temperature of the cells 50 varies which results from the accumulation of heat.

If one of the cells 50 is significantly damaged by heat, the damaged cell 50 acts as a resistor such that high temperature heat is generated. This causes damage to an adjacent cell 50, ultimately resulting in damage to the entire battery module 51. At this time, each cell 50 exhibits a substantial difference in voltage such that undesirable effects are provided to drive motors (not shown) of the electric vehicle.

In the above battery module 51, areas where the heat is concentrated are shown by temperature contour lines 54 of FIG. 5. This results in damage to the cells 50 and a difference in temperature in the battery module 51 such that a large voltage difference is generated.

SUMMARY OF THE INVENTION

The present invention has been made in an effort to solve the above problems.

It is an object of the present invention to provide a battery module structure for an electric vehicle in which an air plate is provided between battery cells to improve cooling efficiency to minimize a difference in temperature caused by the accumulation of heat.

To achieve the above object, the present invention provides a battery module structure for an electric vehicle comprising a plurality of battery cells arranged adjacent to one another to form a group of battery cells; an end plate provided on each end of the group of the battery cells; one or more bands provided on opposing sides of the group of the battery cells, the bands being fastened to the end plates; an air plate interposed between each pair of battery cells; and a fan unit provided on top of the battery module, the fan unit blowing air onto the battery module.

According to a feature of the present invention, each air plate is rectangular in shape and an air passageway is formed within each air plate extending a length of the same.

According to another feature of the present invention, the air passageway increases in its concavity and decreases in width as a center point of the air passageway is approached, the center point corresponding to a center portion of the battery module where the accumulation of heat is most severe.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
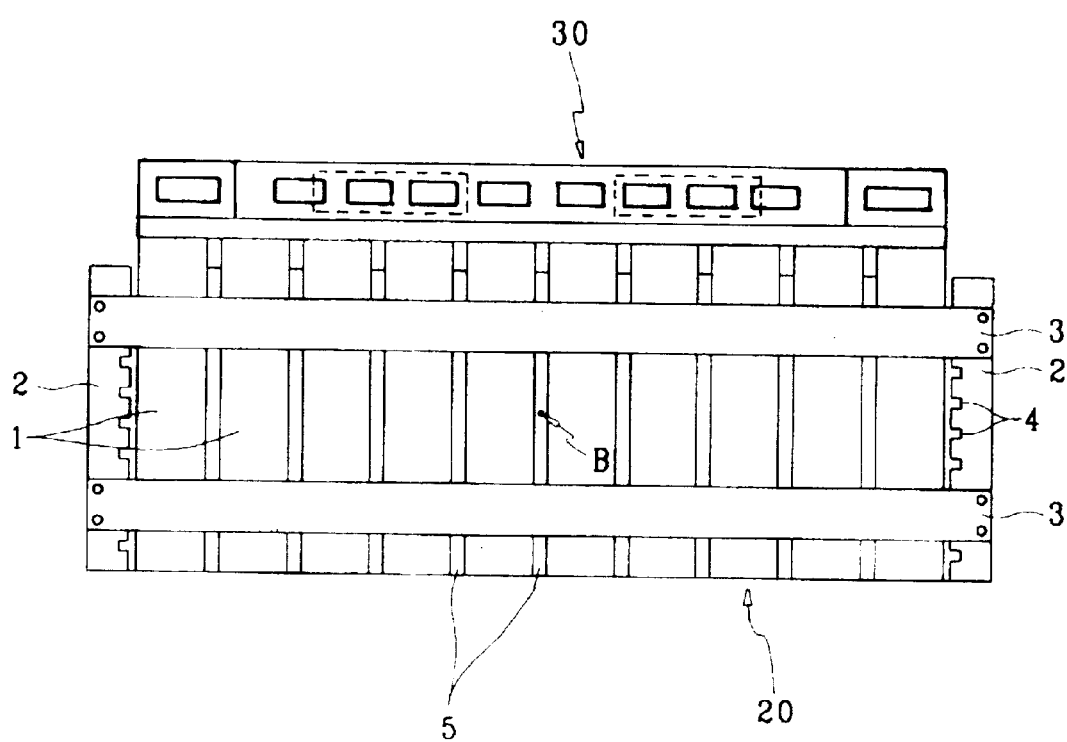
FIG. 1 is a perspective view of a battery module for an electric vehicle according to a preferred embodiment of the present invention.
Figure 2:
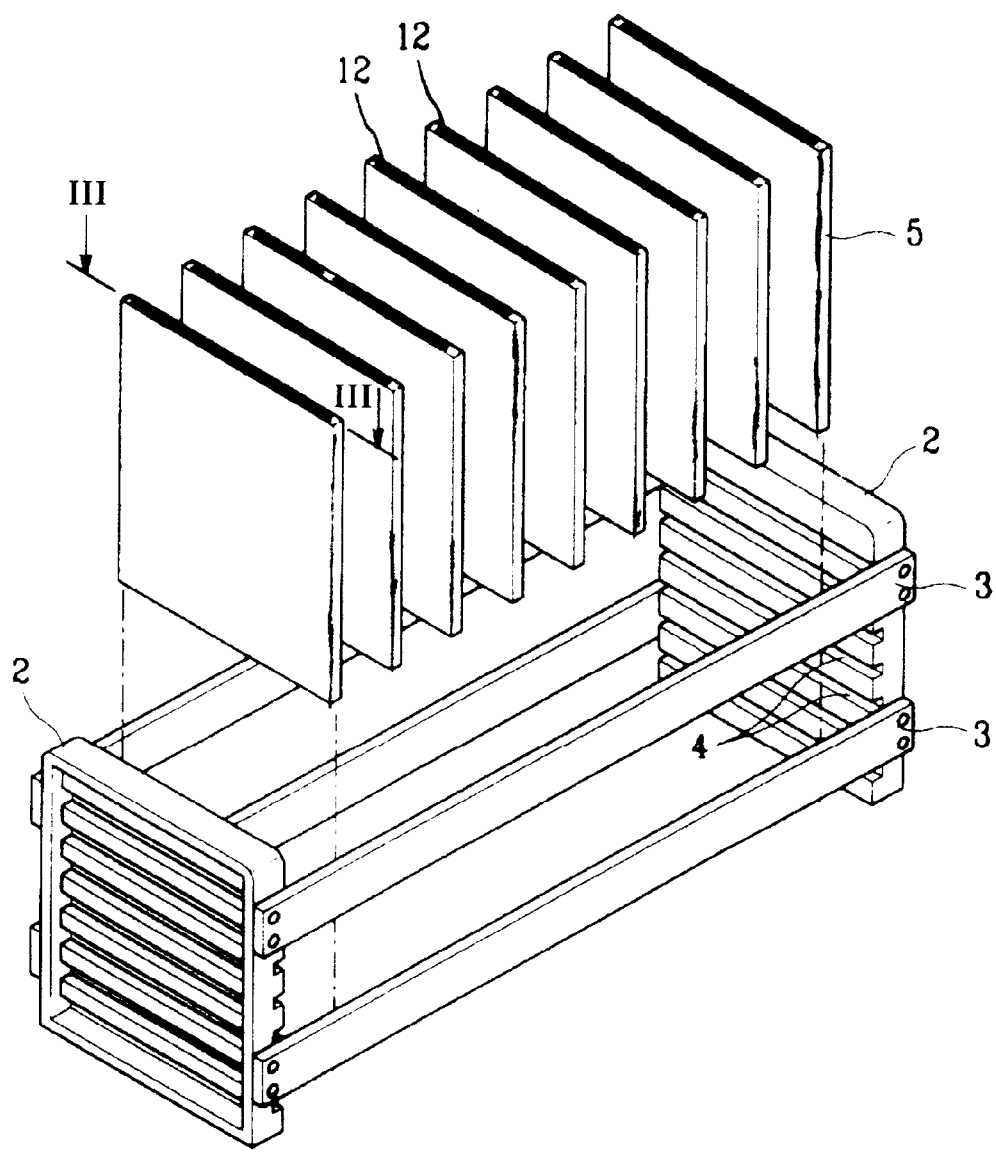
FIG. 2 is an exploded perspective view of the battery module of FIG. 1.

FIG. 1 shows a perspective view of a battery module for an electric vehicle according to a preferred embodiment of the present invention, and FIG. 2 is an exploded perspective view of the battery module of FIG. 1.

A plurality of battery cells 1, ten for example, is arranged adjacent to one another to form a group of battery cells, and an end plate 2 is provided on each end of the group of the battery cells 1. A battery module 20 is completed by a pair of bands 3 provided on opposing sides of the group of the battery cells 1. The bands 3 are fastened to the end plate 2. Interposed between each pair of battery cells 1 is an air plate 5. In the example with ten battery cells 1, a total of nine air plates 5 are included in the battery module 20. Also, grooves 4 are formed along a width of the end plates 2 at predetermined intervals.

Figure 3:
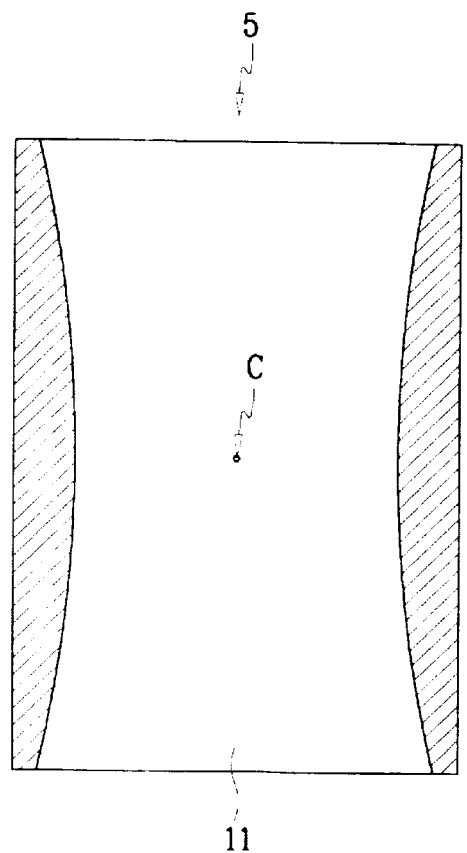
FIG. 3 is a sectional view of an air plate taken along line III—III of FIG. 2.
Figure 4:
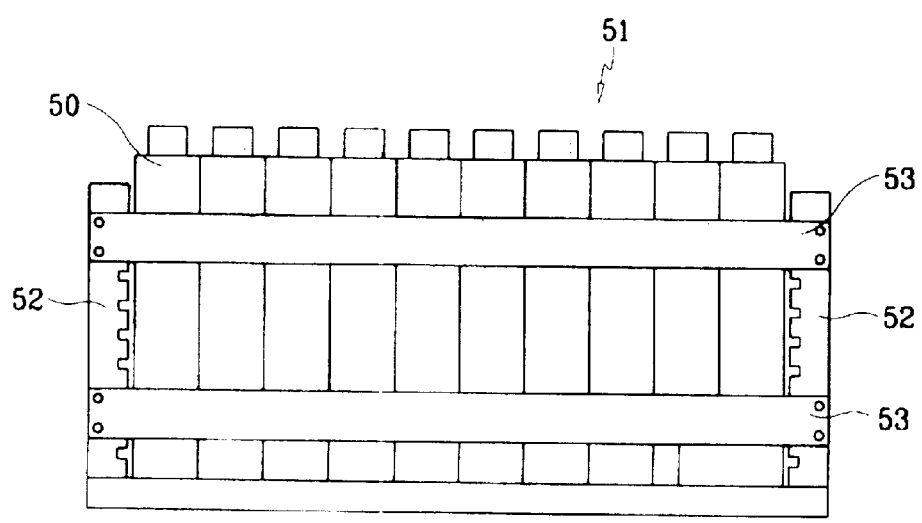
FIG. 4 is a perspective view of a conventional battery module for an electric vehicle.
Figure 5:
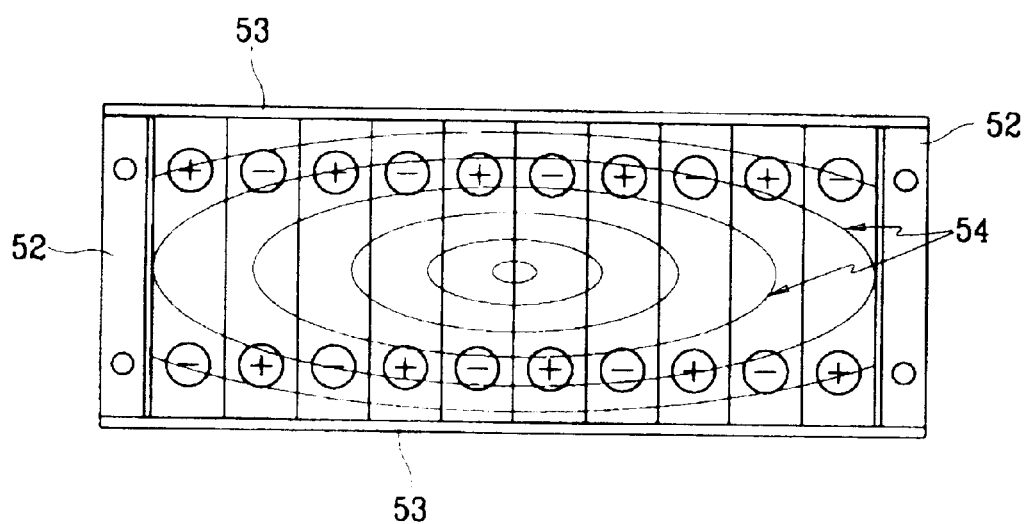
FIG. 5 is a plan view of temperature contour lines of the battery module of FIG. 4.

With reference to FIG. 3, each air plate 5 is rectangular in shape and an air passageway 11 is formed within each air plate 5 extending a length of the same. The air passageway 11 increases in its concavity and decreases in width as a center point C is approached. Accordingly, a center portion B of the battery module 20 (see FIG. 1), where heat accumulates, is kept cool.

Further, with reference again to FIG. 1, a fan unit 30 is provided on top of the battery module 20. The fan unit 30 blows air onto the battery module 20. Much of the air is forced through the air passageways 11 of the air plates 5 to cool the cells 1. Because of the formation of the air passageways 11 in an increasing concave shape and decreasing width as the center points C of the air plates 5 are approached, the flow of air increases at the center points C, then slows as the distance from the center points C is increased. This enhances the dissipation of heat at the center portion B of the battery module 20.

In the present invention structured and operating as described above, since a rate at which heat is dissipated (Kcal/h) varies at different locations of the battery module 20, differences in temperature caused by the accumulation of heat between the cells 1 is minimized. Therefore, each cell 1 outputs a uniform voltage, and the life cycle of the battery module 20 is increased.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A battery module structure for an electric vehicle comprising:

a plurality of battery cells arranged adjacent to one another to form a group of battery cells;

an end plate provided on each end of the group of battery cells;

one or more bands provided on opposing sides of the group of battery cells, the bands being fastened to the end plates;

an air plate interposed between each pair of battery cells, wherein each air plate is rectangular in shape, and
wherein an air passageway is formed within each air plate, the air passageway extending a length of the air plate, and wherein the air passageway increases in concavity and decreases in width as a center point of the air passageway is approached, the center point corresponding to a center portion of the battery module where the accumulation of heat is most severe; and a fan unit provided on top of the battery module, the fan unit blowing air onto the battery module.

2. A battery module structure for an electric vehicle comprising:

a plurality of battery cells arranged adjacent to one another to form a group of battery cells;

an end plate provided on each end of the group of battery cells;

one or more bands provided on opposing sides of the group of battery cells, the bands being fastened to the end plates;

an air plate interposed between each pair of battery cells,
wherein an air passageway is formed within each air plate, the air passageway extending a length of the air plate, and
wherein the air passageway increases in concavity and decrease in width as a center point of the air passageway is approached, the center point corresponding to a center portion of the battery module where the accumulation of heat is most severe; and a fan unit provided on top of the battery module, the fan unit blowing air onto the battery module.

* * * * *